(12) United States Patent
Shemeta (10) Patent No.: US 7,344,341 B2
(45) Date of Patent: Mar. 18, 2008

(54) DRILL

(75) Inventor: Paul Joseph Shemeta, Seattle, WA (US)

(73) Assignee: West Coast Industries, Inc., Seattle, WA (US)

(*) Notice: Subject to any disclaimer, the term of this patent is extended or adjusted under 35 U.S.C. 154(b) by 569 days.

(21) Appl. No.: 10/305,992

(22) Filed: Nov. 27, 2002

(65) Prior Publication Data

US 2004/0101376 A1    May 27, 2004

(51) Int. Cl.
*B23B 47/22* (2006.01)

(52) U.S. Cl. .................. 408/79; 408/124; 408/130; 408/702

(58) Field of Classification Search ............. 408/79, 408/97, 124, 130, 702; 173/4, 11, 17, 152
See application file for complete search history.

(56) References Cited

U.S. PATENT DOCUMENTS 2,633,709 A * 4/1953 Dales ........................ 60/377
2,910,895 A * 11/1959 Winslow ..................... 408/10
4,453,868 A * 6/1984 Winslow .................... 408/138
4,545,748 A * 10/1985 Middlekauff ............... 418/61.3
4,594,030 A * 6/1986 Weigel, Jr. .................. 408/10
4,824,347 A * 4/1989 Dlugokecki ................ 418/61.3
4,842,078 A * 6/1989 Hansson .................... 173/178
4,881,435 A * 11/1989 Hansson ..................... 81/469

* cited by examiner

Primary Examiner—Monica Carter
Assistant Examiner—Sara Addisu
(74) Attorney, Agent, or Firm—Knobbe, Martens, Olson & Bear, LLP (57) ABSTRACT

A portable power drill having an automatic drilling cycle for feeding a rotating tool bit to a workpiece to effect the desired operation. The drill uses a rotary gerotor pump to pump hydraulic fluid used in its system, and pressurized air to operate the hydraulic pump. The drill has a clamping assembly which clamps the unit on a workpiece before the drill bit is advanced toward the workpiece. The drill also has an integral drill spindle-planet carrier area which adds to its operability and reliability.

17 Claims, 9 Drawing Sheets

DRILL

BACKGROUND OF THE INVENTION

1. Field of the Invention

This invention relates to portable power tools and more specifically, to powered drilling apparatus of the type that executes an automatic drilling cycle consisting of: (1) clamping the drilling apparatus to the workpiece and, in most instances, to a template or jig that positions the drill spindle relative to the workpiece; (2) advancing or feeding a rotating tool bit (e.g., twist drill, countersink, or combined twist drill-countersink) to effect the desired machining operations; (3) withdrawing the tool bit from the machined opening and (4) releasing the clamping mechanism that secures the drilling apparatus to the workpiece.

2. Description of the Prior Art

Pneumatically operated, self-colleting, power feed drill motors of the above-mentioned type are presently utilized in the manufacture of various structural assemblies, being of particular importance in the drilling and countersinking of precision holes during the fabrication, maintenance, and repair of airframe assemblies, including conventional transport aircraft and space vehicles. As known to those skilled in the art, such drill motors are generally clamped to the workpiece by means of a collet foot or base assembly that extends from the forward portion of the drill motor. An expansible collet that is alternatively located at a fixed position in the base assembly or mounted therein so as to be an adjustable distance from the position at which a twist drill (or other tool bit) is to contact the workpiece is operated by a mandrel that extends through the collet. The mandrel is in turn operated by an axially translatable drawbar that is connected to the piston of a pneumatic cylinder so that the collet expands and contracts as the drawbar is moved respectively away from and toward the base assembly.

In the most commonly employed manufacturing method, a thin metal template having openings that define the desired hole pattern is placed against a workpiece such as, for example, aircraft skin panels that are temporarily held in position against structural members of an aircraft wing, fuselage, or other such assembly or subassembly. The drill motor is then positioned so that the base assembly abuts the template with the collet extending through an opening in the template and through a previously-drilled hole in the workpiece. A shoulder or boss that circumferentially surrounds an opening through which the drill or tool bit will emerge is positioned within a second opening of the template. The power tool is then activated by squeezing a conventional trigger control on a pistol-grip type handle that extends from the drill motor and the pneumatic cylinder retracts the drawbar and mandrel so that the collet expands in the opening of the workpiece. This action insures that the base assembly remains against the workpiece and clamps the drill motor in the proper position. A pneumatic motor is automatically activated to drive the drill spindle via reduction gears and a second pneumatic cylinder drives the spindle so as to feed the rotating tool bit into the workpiece. During this portion of the sequence, a hydraulic control circuit maintains the feed rate at or within desired limits. When the outward extension of the spindle reaches a preset limit or stop position, the sequence is reversed to retract the tool bit and then move the mandrel away from the base assembly to allow the collet to contract so that the drill motor can be repositioned in a different opening of the template.

Although satisfactory in some situations, prior art drill motors of the above-described type exhibit several disadvantages and drawbacks. First, such drill motors are relatively large and heavy and because of such size and weight often cannot be utilized in limited quarters. Secondly, drill motors of the above-described type have remained a rather specialized tool with a single type of drill motor accommodating only a rather limited range of drilling depths, drill diameters, drilling speed and feed rate. Moreover, although an expansible collet that replaces the above-discussed base assembly adapts some prior art drill motors for use with precision drill jigs, prior art devices have not been adaptable to other manufacturing situations.

Another drawback and disadvantage of the prior art apparatus is that hydraulic pressure for the hydraulic control system has generally been provided by a gear-type pump that is driven by the same pneumatic motor that drives the drill spindle as well as the system feed and clamp cylinders. Because of this, the clamp-up force and feed thrust provided by prior art drill motors have not been as great as possible. Moreover, the gear-type pump of such a prior art unit is constantly driven throughout the entire period of time that the drill motor is actuated. Thus, both the pump and the pneumatically-driven motor are subject to substantial wear and maintenance. Moreover, driving the gear pump during the period in which the workpiece is being drilled or machined in another manner can unnecessarily limit the torque produced by the drill motor. This can be especially important when a drill breaks through the workpiece, since stalling is then more likely to occur. In some cases, if the drill motor stalls, hydraulic power may terminate and allow the drill motor to unclamp from the workpiece. Such unclamping can assert bending loads that break the drill bit and/or damage the hole that has been machined in the workpiece.

Additionally, the hydraulic control circuits utilized in the prior art drill motors to automatically sequence the tool through the steps of "clamp-up," drill thrust, drill retraction and unclamping, are relatively complex and are not as reliable as is often desired. In some cases, the requirements of the pneumatic drill motor reduce the clamp-up and thrust forces to a degree that results in hole elongation, drill breakage, or other damage. Prior art drill motors have limited hole-making accuracy because the forward and rear drill spindle support bearings are not rigidly attached in an essentially one-piece housing with the result that the rear bearing slides relative to the front bearing while the machine is drilling. This sliding requires mechanical clearance, which when combined with the resistance developed by the hydraulic feed control mechanism which is not in line with the feed force, causes the rear spindle bearings to move off-axis from the centerline of the hole to be drilled. In addition, the forward spindle bearing is a plain bearing which needs clearance to prevent seizure of the drill spindle. This clearance also limits the potential accuracy of the drilled hole, and allows fine drilling chips into the clearance between the spindle and plain bearing. The chips cause accelerated wear, reducing hole accuracy and increasing tool maintenance.

One United States patent which attempted to address the shortcomings of the prior art discussed above is U.S. Pat. No. 4,594,030 issued to Weigel. This particular embodiment had advantage over the drills in the prior art, but had difficulties due to its design. One of the major drawbacks of Weigel was that hydraulic pump design problems arose with its piston-type shuttle pump resulting in air leaking in the oil used in that pump, resulting in air bubbles in the hydraulic system causing failure ultimately. Means to bleed air from the system were lacking. Further, the drill used a plain spindle bearing which had difficulty with its ability to be lubricated. Given the allowed clearance for the disclosed bearing, it was impossible to get a proper oil film on it to facilitate lubrication. If more clearance in the drive system was built in to allow the bearings to be coated with oil, thereby preventing excess heat and eventually failure, accuracy of the drilled hole was sacrificed. This one defect rendered the unit of that patent problematic during operation.

Other problems with Weigel included its clamping system wherein the unit is clamped to the workpiece prior to drilling. The many linkages involved resulted in binding problems which were significant. The linkage was not strong enough in the high clamp forces created by the hydraulic clamp cylinder which assured a tight clamping to the workpiece. The links in the Weigel system tended to flex and eventually jam. Other shortcomings of the system of the Weigel patent also existed including the force required to operate the drill trigger, and the fact that the collet of the clamping system pulled only with a center pin, resulting in less strength and rigidity in that system than what was desired.

Accordingly, it is an object of this invention to provide a drill for drilling precise and accurate holes on a workpiece, such as an airplane fuselage, which functions efficiently, smoothly, and consistently.

Another object of the present invention is to provide a drill that is adaptable to a large number of drill bit sizes and drilling requirements specified in the aircraft industry.

Yet another object of the present invention is to provide a drill apparatus that can be used to drill holes in applications that require accuracy.

SUMMARY OF THE INVENTION

These and other objects of the present invention will be accomplished by the drill apparatus as described in the following summary and disclosure. In the main embodiment, the drill is a pneumatic-hydraulic drill which has a main housing. The main housing has an opening running longitudinally therethrough from what can be considered the front end of the drill (the end closest to the workpiece during operation) to the rear end of the drill. The drill apparatus has as one of its component assemblies used during its operation a hydraulically activated feed cylinder. The feed cylinder is external to the main housing of the drill unit and is located adjacent to the rear end of the housing mentioned above. In its simplest terms, the feed cylinder has a forward and rearward end in which the forward end is adjacent to the rear end of the main housing with a central bore running through the feed cylinder. The central bore of the feed cylinder is substantially parallel to the opening within the main housing. The feed cylinder also has an outer piston having an axial bore that extends forward from the piston partially disposed within it. The outer piston can move axially within the central bore of the feed cylinder and main housing. The feed cylinder also includes in it a stationary inner piston having a bore disposed in the bore of the outer cylinder.

The drill apparatus according to the present invention also has a pneumatically activated motor. This pneumatically activated motor is configured to fit within the opening aforementioned in the main housing. The pneumatically activated motor has a forward end (the end closest to the workpiece) and a rear end. The rear end of the pneumatically activated motor is attached to the forward end of the bore of the outer piston. As mentioned above, the bore of the outer piston is in fluid communication with the pneumatically activated motor. The communication between the bore of the outer piston and the pneumatically activated motor allows pressurized air to be supplied to the pneumatically activated motor during operation of the drill. The pressurized air will allow the pneumatically activated motor to eventually turn the drill spindle of the drill apparatus allowing a drill bit to drill a hole in the workpiece. As the pneumatically activated motor is connected to the bore of the outer piston, the pneumatically activated motor can be moved along a longitudinal axis through its center. If the outer piston is in a retracted position, the pneumatically activated motor will be in a rearmost position. When the outer piston is in an extended position, the pneumatically activated motor will be in a forward position with the main housing.

To supply pressurized hydraulic fluid to the hydraulic circuit of the drill apparatus, a pneumatically operated rotary gerotor pump is provided. The rotary gerotor pump differs in a significant way from a conventional piston-type shuttle pump in its operation and ultimately in the results it produces an efficient operation of the drill apparatus. The rotary gerotor pump is actuated by an air motor connected thereto which when activated pressurizes hydraulic fluid with the hydraulic circuit of the apparatus. The hydraulic fluid is delivered to the feed cylinder of the apparatus which drives the retraction and extension of the outer piston.

To allow operation of the drill of the present invention with all of its requirements and versatility, a valve system is used to control the operation of the drill. The valve system of the drill uses a number of valves responding to pneumatic or hydraulic pressure which controls the clamping operation and the drilling operation of the drill apparatus. To supply air from a source of pressurized air, such as a compressor, to the proper parts of the drill apparatus, a circuit is provided. The circuit supplies pressurized air to the bore of the outer piston. The circuit also provides pressurized air to the rotary gerotor pump and to the valve system mentioned above. This circuit for supplying air from a source of pressurized air also includes a sub-circuit for supply air to the rotary gerotor pump. The drill also has a second circuit which serves to supply pressurized hydraulic fluid to the feed cylinder and to the valve system of the drill apparatus.

The rotary gerotor pump of the present invention has a gerotor assembly which replaced the prior art hydraulic pump internal assembly so as to prevent pressurized air from the air motor of the pump from leaking into the hydraulic fluid used by the rotary gerotor pump. To that end and more specifically, the gerotor assembly of the rotary gerotor pump of the present invention has a first gear with external gear teeth and a second gerotor gear having internal teeth which cooperate with the teeth of the first gear. With this setup and suitable seals, as will become more apparent from the detailed description of the rotary gerotor pump and its cross-sectional figure, the problem of pressurized air leaking into the pump and contaminating the hydraulic fluid of the pump with air bubbles is obviated. The rotary gerotor hydraulic pump of the present invention also conveniently allows for a reservoir of hydraulic fluid being in the circuit of hydraulic fluid. The reservoir is located outside the main housing of the apparatus, preferably for convenient venting to remove any air bubbles which may appear in the hydraulic fluid used in the drill. The rotary gerotor pump of the present invention also provides for a filter which is used to prevent circulation of foreign particles in the hydraulic system thus preventing wear and malfunction within the drilling apparatus.

The operation of the drill is initiated by an operator pulling a trigger conveniently situated on the drill. To make this operation somewhat easier for the operator, in a preferred embodiment of the apparatus, a pilot valve is provided which is responsive to the operator's finger movement. The pull of the trigger of the apparatus opens the pilot valve which in turn operates a pulse valve. The force required on the trigger to operate the pilot valve is significantly less than the force required to pull the trigger without a pilot valve. The operator, therefore, is less susceptible to tiring, especially after extended use of the drill as the force required by the operator's trigger finger during operation of the drill is diminished.

One other aspect of the circuit supplying pressurized air to the drill deserves mention, as it is an improvement over the prior art. In the apparatus of the present invention, an automatic cycle mode is provided. Essentially, the circuit for providing pressurized air to the drill during operation is such that when automatic mode is activated, the trigger is held depressed until the hole is completely drilled. Upon completion of the drilling of the desired hole, the drill bit is retracted from the hole by movement of the feed cylinder. At this point the drill unit turns itself off stopping turning of the drill bit. The drill, however, remains clamped to the workpiece. The net result is that the amount of air wasted on turning the drill bit when it is retracted from the hole is eliminated. This savings of pressurized air becomes significant as the amount of usage of the drill increases in its normal application.

Another sub-assembly of the drill apparatus is the drill spindle assembly. The drill spindle assembly includes a drill spindle extending from the opening in the main housing at the front end of the main housing (the end closest to the workpiece). The drill spindle has a front end and a rear end with the rear end connected to the pneumatically actuated motor discussed somewhat previously. The drill bit for actual drilling of the hole in the workpiece will extend from the front end of the drill spindle and preferably is threaded into the drill spindle. The drill spindle is able to accommodate a wide selection of drill bits depending on the application and its specific requirements. In a preferred embodiment of the drill spindle, the rear end of the drill spindle is integral with a planet gear carrier. In prior art applications, it can be mentioned that a joint occurred at this interface which resulted in problems with the operation of the drill, especially regarding precision and accuracy of the drilled hole. As will be described in further detail in a later section of the disclosure, a planet carrier is integral with the spindle resulting in elimination of a joint therebetween.

The clamping assembly of the present invention serves to securely clamp the drill to the workpiece so as to permit accurate drilling of the desired holes. The clamp assembly has a front end (the front end being the end nearer the workpiece) and a rear end further from the workpiece. The clamp assembly includes a hydraulically activated clamp cylinder which is connected to the rear end of the clamping assembly. The hydraulically activated clamp cylinder is axially aligned with the clamp assembly as a whole. The clamp cylinder has a bore, and the clamp cylinder has a front end and rear end. The clamp cylinder also includes a piston and a collet puller disposed within the bore of the clamp cylinder. The piston and collet puller are configured for movement axially within the bore of the clamp cylinder. The clamp assembly also includes a collet having an axial bore and collapsible outer diameter with a pilot disposed in the axial bore. The pilot is fixed to the collet puller of the clamp cylinder and moves axially in response to movement of the collet puller and piston of the clamp cylinder. To clamp the drill unit on the workpiece, the collet with tapered pilot therein is placed through a given pre-drilled hole. When the pilot is fully forward within the collet, the trigger is activated. The collet with pilot therein is larger in diameter than the pre-drilled hole. The drill is in a stable clamped position on the workpiece prior to drilling of a new hole when the piston and collet puller are moved rearward with the collet and pilot therein acting as a single tension member. It should also be mentioned that the clamping assembly includes a clamp foot. The clamp foot abuts the workpiece and is mounted on the drill. The collet fits through an aperture in the foot. The clamp foot serves to support and stabilize the drill and in its preferred embodiment is generally symmetrical. Also in the preferred embodiment, the clamp foot is configured to allow movement of the collet relative to the clamp foot.

The valving of the drill unit also includes a four-way, two-position hydraulic valve that is positioned between the hydraulic pump and the feed and clamp cylinders. The hydraulic valve is actuatable between a first position wherein pressurized hydraulic fluid is supplied to the retract chamber of the feed cylinder causing the piston to retract, and a second position wherein pressurized hydraulic fluid is applied to the extend chamber of the feed cylinder causing the piston to extend. A spring pilot biases the hydraulic valve in its first position and an air actuated pilot moves the hydraulic valve from its first to its second position when pressurized air is supplied to the pilot. The air actuated pilot is in fluid communication with a retract valve that is mounted in the forward end of the casing. The retract valve initiates the actuation of valves to cause the motor to retract and also operates as a mechanical stop to limit the forward travel of the motor.

A pulse valve is positioned between the pilot valve actuated by the trigger of the drill, and the portion of the pneumatic circuit consisting of the retract valve and the pilot of the hydraulic valve. The pulse valve is actuatable between a first position wherein the retract valve and pilot are in fluid communication with the pilot valve and a second position wherein the retract valve and pilot are isolated from the pilot valve. The pulse valve transmits a pulse of pressurized air to the retract valve and the pilot of four-way hydraulic valve when the pulse valve is in its first position. A first pilot moves the pulse valve into the first position when the pilot valve is first actuated, and a second pilot moves the pulse valve into its second position a set time interval after the pilot valve has been actuated.

The drill unit also includes a sequence valve that is positioned between the hydraulic valve and the extend chamber of the feed cylinder. The sequence valve is actuatable between a first position wherein the hydraulic valve is not in fluid communication with the extend chamber and a second position wherein the hydraulic valve is placed in fluid communication with the extend chamber. The sequence valve includes a hydraulic pilot that moves the sequence valve into its second position when the hydraulic pressure reaches a predetermined percentage of the final value. This results in a time delay that insures that the drill unit is clamped to the workpiece before the feed cylinder begins to advance the motor and tool bit toward the workpiece.

In the preferred embodiment, the pulse valve and a portion of the pneumatic circuitry is housed within a pneumatic module that is mounted to the casing. A hydraulic logic module that also mounts to the casing contains the hydraulic valves and a portion of the drill unit hydraulic circuitry.

When the drill unit is to be used in a drilling operation, it is attached to a source of pressurized air. Upon supplying pressurized air to the drill unit, the hydraulic pump operates to establish the necessary hydraulic pressure to activate the feed and clamp cylinders. The collet of the drill unit is inserted into a hole that has been previously drilled in the workpiece, and the foot of the clamp unit is held against the workpiece or a template attached to the workpiece. When the tool bit of the drill unit is aligned with the location at which a hole is to be drilled, the trigger valve is actuated and pressurized air is supplied to the air motor causing it to rotate the tool bit. Actuation of the trigger valve also allows pressurized air to pass through the pulse valve and pressurize the retract valve and the pilot of the hydraulic valve, thereby moving the hydraulic valve into its second position which allows hydraulic fluid to pressurize the clamp and feed cylinders. After pressurization of the retract valve and the pilot, the pulse valve shifts into its second position, isolating the retract valve and pilot from the rest of the pneumatic circuit.

When the hydraulic valve is shifted into its second position, pressurized hydraulic fluid is directed to the clamp cylinder causing the collet to clamp to the inner surface of the hole into which it was inserted. Pressurized hydraulic fluid is simultaneously directed to the sequence valve. The sequence valve is actuated by its hydraulic pilot when a predetermined pressure is reached due to stalling of the clamp assembly on the workpiece and allows hydraulic fluid to flow to the extend chamber of the feed cylinder. When the pressurized hydraulic fluid enters the extend chamber, the piston of the feed cylinder is urged forwardly, thereby advancing the motor and rotating the tool bit toward the workpiece. Once a hole has been formed in the workpiece, the motor contacts the retract valve. The retract valve is actuated to release pressurized air to the atmosphere, thereby releasing the pressurized air held in the circuit formed by the retract valve and the pilot of the hydraulic valve. When the pressure at the pilot is released, the hydraulic valve is moved back into its first position by the spring pilot to start the retract portion of the drilling cycle.

With the hydraulic valve in it first position, pressurized hydraulic fluid is directed to the retract chamber of the feed cylinder and the extend chamber of the clamp cylinder. The pressurized hydraulic fluid filling the retract chamber of the feed cylinder causes the feed cylinder to retract the motor and tool bit away from the workpiece. The pressurized hydraulic fluid supplied to the pilot-operated check valve of the clamp circuitry causes the collet to unclamp and allows the drill unit to be withdrawn from the workpiece, thus completing a drilling cycle.

DETAILED DESCRIPTION OF THE PREFERRED EMBODIMENT

Figure 1:
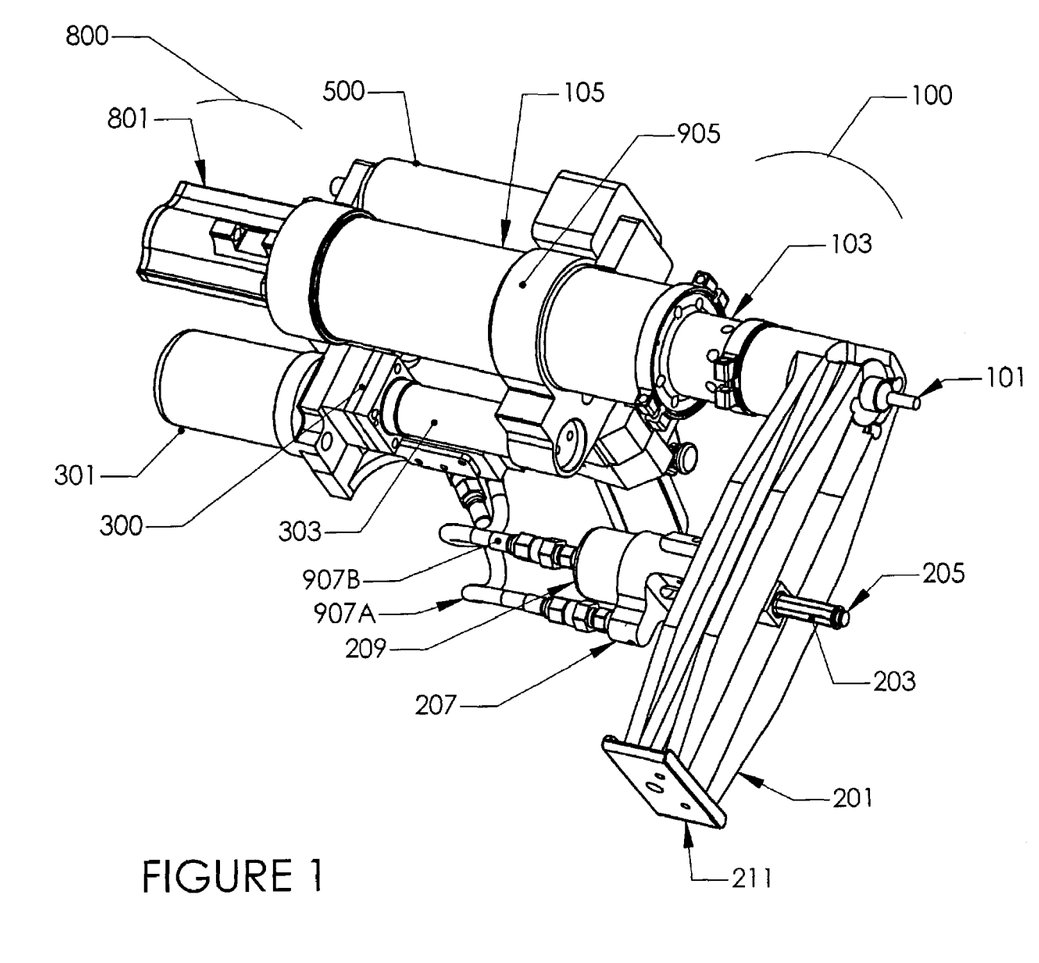
FIG. 1 is a perspective view of a drill in accordance with the present invention looking down upon the drill and from the right side.
Figure 2:
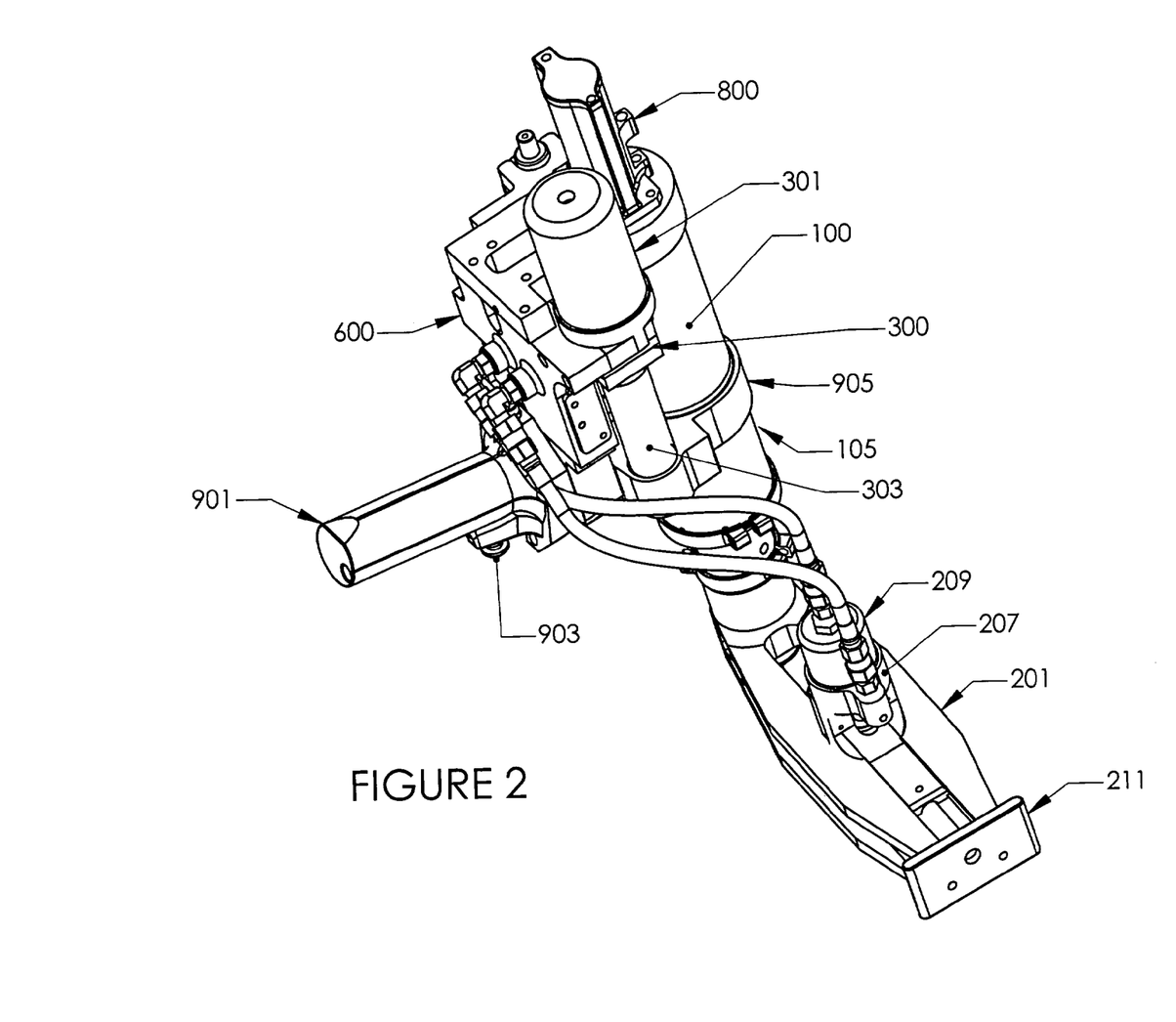
FIG. 2 is a perspective view of a drill in accordance with the present invention looking up at the drill from the right side from a position rear of the drill.
Figure 3:
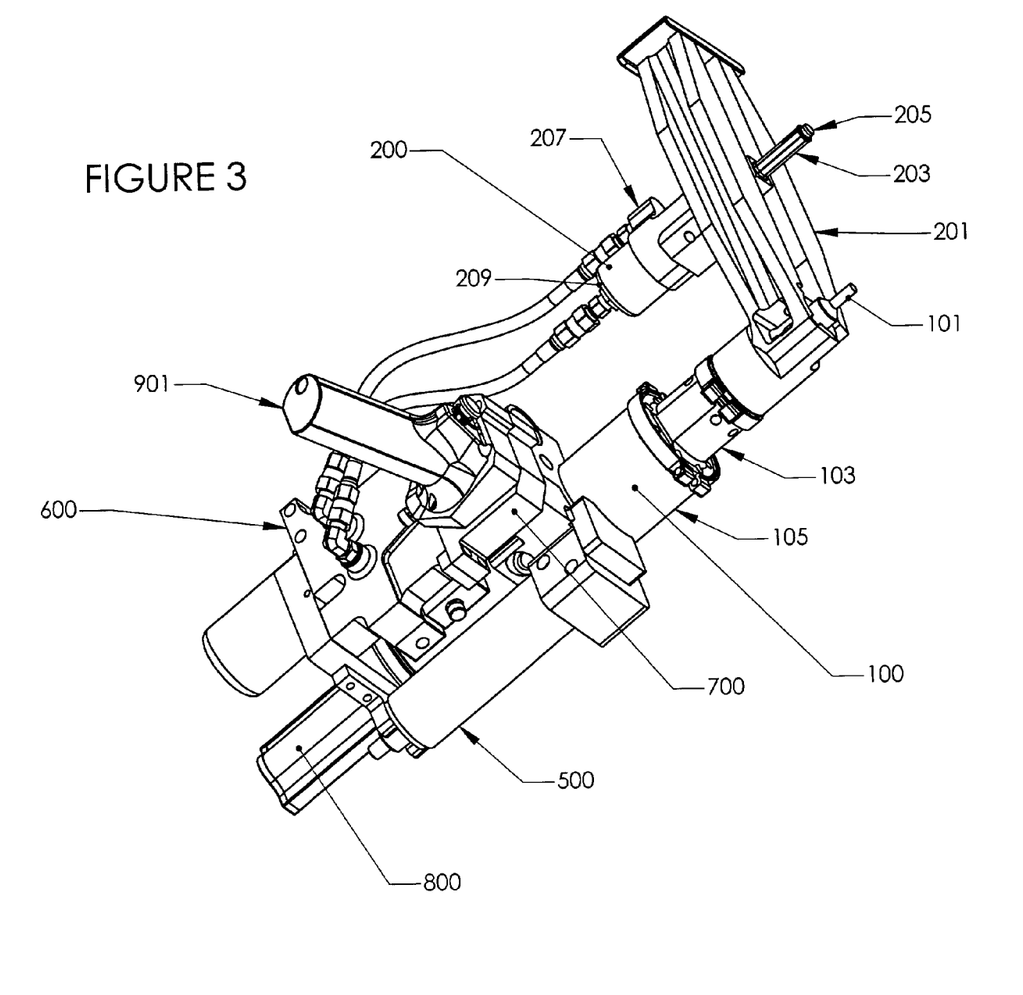
FIG. 3 is a perspective view of a drill in accordance with the present invention looking up at the drill from the left side and from a position forward of the drill.

Referring now to the drawings, and especially to FIGS. 1, 2, and 3 initially, the general configuration of a drill apparatus can be described. One of the main components of the drill of the present invention is a drill spindle assembly generally designated as reference numeral 100. The drill spindle assembly 100 has a main housing 105, and nosepiece 103 extending from the forward end of the main housing 105. The details of the nosepiece 103 and of the drill spindle 100 will be described later in the disclosure, the present discussion identifying only the general configuration of the drill. In any case, the drill nosepiece 103 holds a drill bit 101 which extends from the forward end of the drill nosepiece 103. The drill bit 101 is used to perform work on a hole in the workpiece (not shown in FIGS. 1, 2, and 3). The main housing 105 contains an air motor 107 (best seen in FIG. 4) which serves to rotate the drill bit 101 during operation of the apparatus. A feed assembly generally designated as 800 has as a component feed cylinder 801. Feed cylinder 801 controls movement of the drill spindle assembly 100 to and from the workpiece in an axial direction. The feed cylinder 801 extends from the rearward end of main housing 105 of the drill spindle assembly 100. In fluid communication with the feed cylinder 801 is a hydraulic pump 300, and more specifically, a pneumatically operated rotary gerotor pump which delivers pressurized hydraulic fluid to feed cylinder 801 during operation of the apparatus. A valve system which will be described later in the disclosure and a circuit for providing pressurized air to the various components and assemblies of the drill will be described in further detail later in the disclosure. The hydraulic pump 300 has a reservoir 301 which holds a suitable quantity of hydraulic fluid for use in the hydraulic circuitry of the drill including the feed assembly 800 and hydraulic valve system which will be further described in a later section of the disclosure. The hydraulic pump is also connected to an air motor 303 which is located forward of the hydraulic pump 300 and serves to operate the hydraulic pump 300 taking pressurized air from a source not shown. The hydraulic pump 300 of the drill also is connected with hydraulic hoses 907A and 907B to a clamp assembly 200 located on the side of the drill to the right of the drill spindle 100 when the drill is being operated. Clamp assembly 200 has as its purpose to clamp the drill to a workpiece thereby allowing more precise drilling operations on any hole to be made in the workpiece. To that end, clamp assembly has a clamp cylinder 209 which has a clamp cylinder base 207 fixed thereto. A collet 203 extends from the forward end of the clamp cylinder base 207. Collet 203 has a pilot 205 disposed in an axial opening of the collet 203. The pilot 205 is adapted for axial movement within the collet 203 in response to hydraulic fluid from the hydraulic pump 300. The pilot 205 has a retracted position within the collet 203 whereby the collet can be fit within a pre-existing hole in the workpiece prior to clamping the drill to the workpiece. The pilot 205 also has an extended position within the collet 203 whereby the hydraulic pressure holds the clamp assembly and therefore the drill apparatus to the workpiece. Another part of the clamp assembly 200, preferably, is a clamp foot 201. Clamp foot 201 is slidably attached to clamp cylinder base 207 at its forward end and has an opening therethrough which collet 203 is disposed in during operation of the drill. Clamp foot 201 also is attached to the nosepiece 103 of drill spindle 100 at its forward portion and has a suitable opening at the left end of the clamp foot 201 to receive the drill bit 101. The clamp foot 201 also has a tail pad 211 at its left end (the end nearer the clamp assembly 200) to keep the drill spindle square with the workpiece when drilling, compensating for the thickness of tooling used to locate holes.

The drill apparatus has a main bracket designated as 905 which essentially holds the assemblies of the drill together. The main bracket 905 holds the drill spindle substantially circumferentially around the main housing 105, and also receives the forward end of air motor 303 of the hydraulic pump 300. It also holds a pneumatic block 700 of the drill apparatus. Hydraulic block 600 is adjacent to pneumatic block 700 and contains hydraulic valving and circuitry relating to routing and distribution of hydraulic fluid through the assemblies of the drill apparatus during operation. Pneumatic block 700 contains pneumatic valving and circuitry relating to the routing of pressurized air to the various assemblies of the drill during operation. Handle 901, which is located underneath the apparatus, and is the point of grip for the operator of the drill apparatus. It should also be pointed out that a drill lubrication system 500 is mounted on the left side of the main housing using main bracket 905. The drill lubrication system 500 serves to create a mist of air and lubricant that is pumped through the drill bit 101 to lubricate the drill bit and blow chips out of the hole during drilling, greatly increasing hole accuracy.

Figure 4:
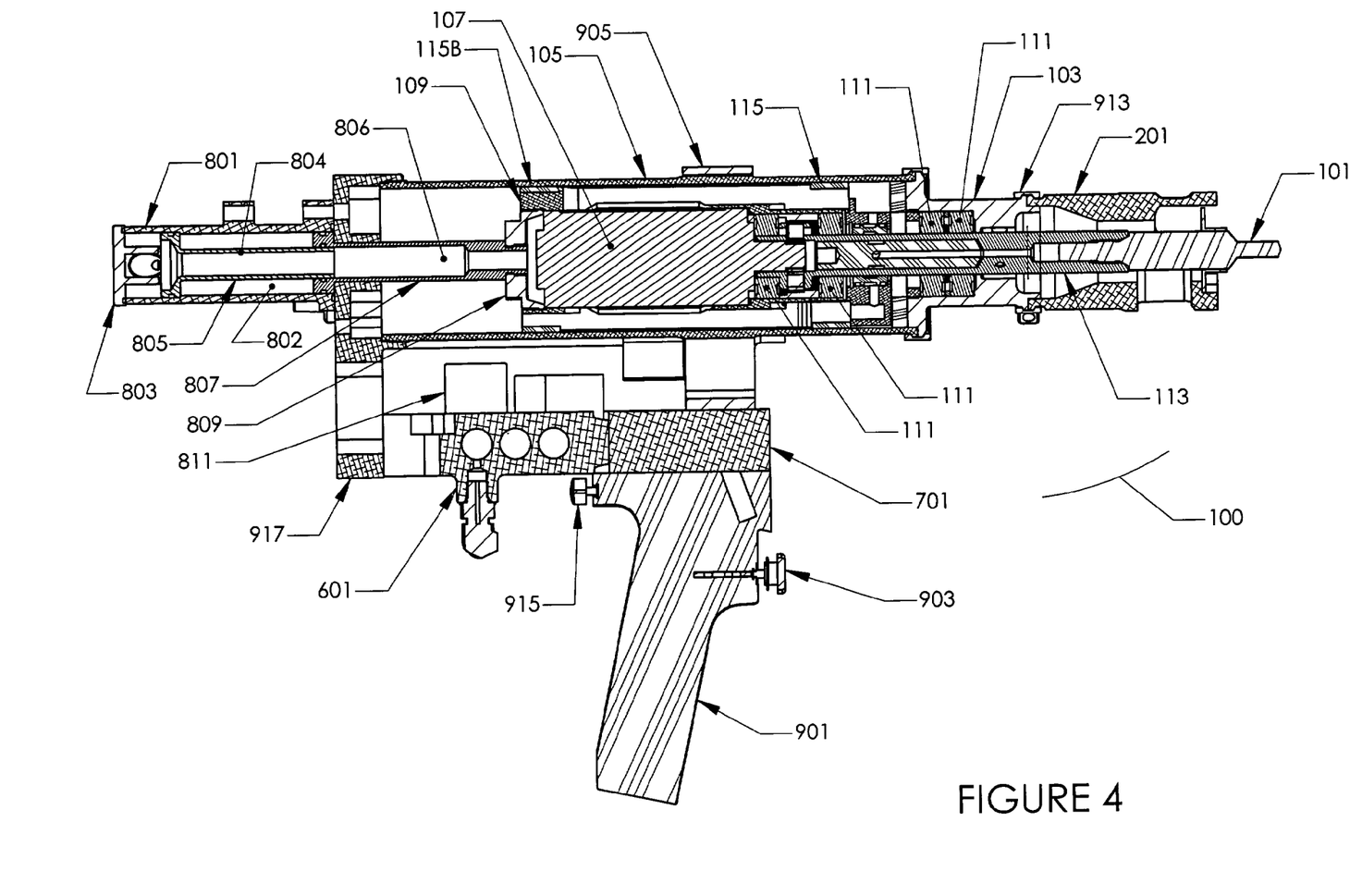
FIG. 4 is a cross-sectional view of the drill of the present invention showing the drill assembly of the apparatus.

Referring now to FIG. 4 which shows a cross-section through several assemblies of the drill, more detail as to the configuration of the drill can be presented. FIG. 4 shows the main housing 105 of the drill containing a main air motor 107. It is the function of the main air motor 107 disposed in main housing 105 to rotate the drill bit 101 for drilling a hole in a workpiece. The main air motor responds to pressurized air routed to it during operation to perform this function. The main air motor 107 is connected at its rearward end to an outer feed piston 807 at least partially disposed within feed cylinder 801. Outer feed piston 807 has disposed within it an inner feed piston 805 extending from its rearward end. Outer feed piston 807 has an axial bore 806 and slides over inner feed piston 805 which has an axial bore 804 itself. Outer feed piston 807 has an axial bore 806 and "telescopes" over inner feed piston 805 which has an axial bore 804 itself. The axial bores 804 and 806 within pistons 805 and 807 respectively serve as a conduit which feeds pressurized air to main air motor 107 during operation of the drill. The outer feed piston 807 pushes drill spindle assembly 100 forward and rearward in response to the hydraulic circuit of the drill. Feed cylinder 801 has a central bore 802 which houses inner feed piston 805 and outer feed piston 807. Feed cylinder 801 has an end cap 803 which seals the rearward end of feed cylinder 801. The forward end of outer piston 807 is threadably connected to a motor retainer 809 which is located on the rearward end of the main air motor 107. The motor retainer 809 supports air motor 107 within housing 105. A feed rate body 811 is provided on hydraulic block 600 which regulates the speed of movement of drill assembly 100 using a feed control restrictor 813. Feed rate body 811 has a feed rate screw (not shown) which is disposed in an inner passage of feed rate body 811. The feed rate screw is threaded and can vary the rate of hydraulic fluid flowing from the feed rate body 811 by changing the length of a triangular passage formed by the screw and body. The rate of movement of the drill assembly 100 toward and away from the workpiece can thereby be controlled by adjusting the feed screw. It can be mentioned that prior art drills used a needle valve which proved to malfunction as the passages for fluid transmission were too small and tended to clog easily. Further detail as to the cooperation of these enumerated parts will follow in subsequent disclosure including the operation of the feed cylinder 801 in moving the main air motor 107 in an axial direction within the housing 105.

The drill spindle assembly 100 is connected to the forward end of the main air motor 107 via a planetary gear train and extends forwardly from the main housing. As shown in FIG. 4, that assembly has a drill spindle 113 which holds a drill bit 101. The drill bit 101 extends from the forward end of the drill spindle 113 and is threaded to the drill spindle 113. The drill spindle 113 sits on bearings designated collectively as 111 (FIG. 4) within the nosepiece 103 and the main housing 105. The drill bit 101 and part of the drill spindle 113 extend through the left section of the clamp foot 201 during operation of the drill. The drill spindle assembly also includes wear rings 115A and 115B disposed in the main housing 105 which abut the inner circumference of the main housing 105. A motor carrier 109 is provided which supports the main air motor 107 within the main housing 105 as it is moved axially by hydraulic pressure through the feed cylinder 801. The motor carrier 109 contacts the inner surface of wear rings 115A and 115B.

At the rear end of the main housing 105, a manifold block 917 is provided. The manifold block connects air and oil passages from a hydraulic block 601 and pneumatic block 701. These two blocks 601 and 701 provide valving and circuits which route hydraulic fluid and pressurized air through the apparatus and to the drill spindle assembly 100 during operation which will be described later in the disclosure using the schematic diagram of FIG. 8. The pneumatic block 701 is located forward of hydraulic block 601 and directly above handle 901 of the drill. The pneumatic block 701 is connected to the main bracket 905 of the drill. A trigger 903 is provided on the forward side of handle 901 which initiates operation of the drill when it is connected to a source of pressurized air. An auto cycle engage button 915 is located on the rear side of the handle 901 and when depressed initiates an automatic cycle that holds trigger 903 depressed until a hole in the workpiece is completely drilled. Upon completion of the drilling of the hole, the drill bit 101 is retracted from the hole just drilled. The rotation of the drill bit 101 stops but the drill remains clamped to the workpiece. The net result is that large amounts of pressurized air are saved as the drill spindle is not rotating needlessly after drilling a hole and prior to unclamping the drill.

Drill Spindle Assembly

Figure 5:
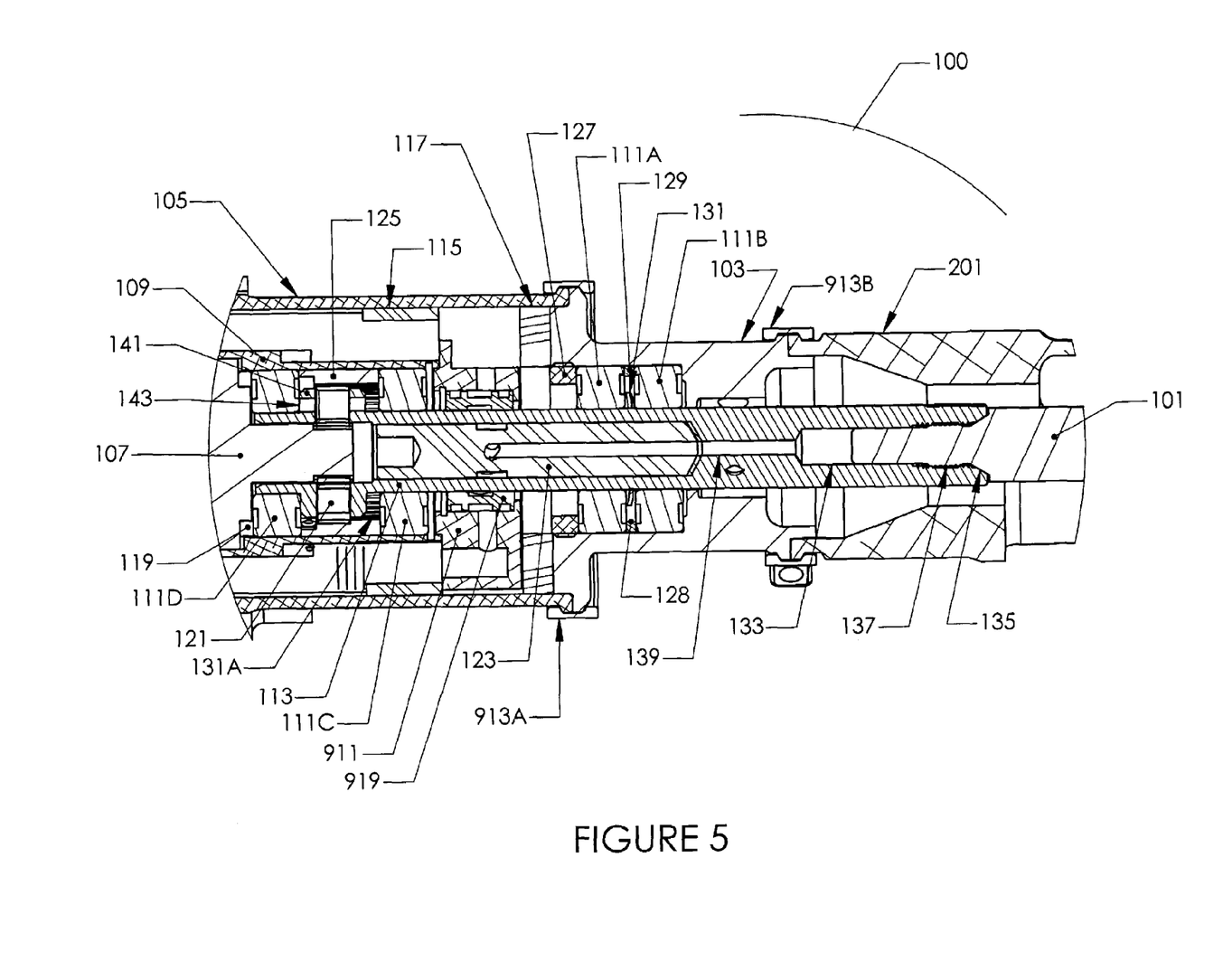
FIG. 5 is a cross-sectional view of the drill spindle assembly of the present invention.

Referring now to FIG. 5, the drill spindle assembly can be described in detail. In that figure, a nosepiece 103 is shown extending from main housing 105 of the drill spindle assembly at the forward end of the main housing 105. The nosepiece 103 is secured to the main housing 105 with a V-band 913A. Disposed partially within the nosepiece 103 and partially within the main housing 105 is a drill spindle 113. Drill spindle 113 has a drill shank locating hole 133 tapped in its forward end. The drill shank locating hole 133 has a tapered portion 135 and a threaded portion 137 to accommodate and threadably fix drill bit 101 to the drill spindle 113. A coolant hole 139 axially runs through the drill spindle filler 123 and communicates with shank locating hole 133. The coolant hole 139 receives coolant from the coolant system assembly 500 (FIG. 1) mounted on the main housing 105. The drill spindle 113 is situated within the nosepiece 103 on angular contact bearings 111A and 111B. These bearings 111A and 111B are separated slightly by a bearing spacer 129. The bearings 111A and 111B also have a cavity 128 which holds a preload spring 131. A bearing retainer 127 is located rearward of bearing 111A and holds the bearings 111A, B in place within the nosepiece 103. The bearing retainer 127 abuts a muffler 117 which is disposed in the main housing 105. The rearward end of the drill spindle 113, the portion which is disposed within the main housing 105, contains a planet gear assembly 121. Spindle 113 has a planet carrier area 141 which contains four gear axles designated as 143 running through the planet gear assembly 121. The configuration allows for an integral drill spindle 113 and planet carrier 141 which eliminates any joint between the planet carrier 141 and spindle 113 which increases the accuracy of the spindle 113. On the forward side of the planet gear assembly 121, an angular contact bearing 111C is situated and on the rearward side an identical bearing, designated as 111D, is located. The bearing 111D abuts an air motor bearing spacer 119 which is disposed in the front end of the main air motor 107. The planet gear assembly 121 and drill spindle 113 are extended out forwardly from the main air motor 107. A preload spring 131A abuts the inner race of bearing 111C and gear axle body 141.

A ring gear 125 is provided which is located adjacent the planet gear 121 at the circumference. FIG. 5 also shows a wear ring 115A between the main air motor 107 and housing 105 which forms a bearing surface between the air motor 107 and housing 105. The wear ring 115A is necessary due to the relative axial movement of an air motor carrier 109 relative to the main housing 105. A fluid inducer body 911 is provided forward of the bearing 111C and the main air motor 107. A fluid inducer seal 919 is located circumferentially adjacent to the rearward position of drill spindle 113. Fluid inducer 911 allows coolant and air from coolant system assembly into the rotating drill spindle 101 during operation of the drill. Inner fluid inducer 919 performs a sealing function and is preferably made of a composition of Teflon, graphite, and carbon fiber. Inner fluid inducer rides against the drill spindle 101, floating in two O-rings which allow it to move with any spindle irregularity without pushing on drill spindle 101 itself. The material chosen for the inner fluid inducer 919 has a high degree of chemical resistance, low swelling capability, high wear resistance, and good anti-seize properties to maintain a close fit to drill spindle 101 during operation even at high speeds for the most efficient cooling of the drill point.

Clamp Assembly

Figure 6:
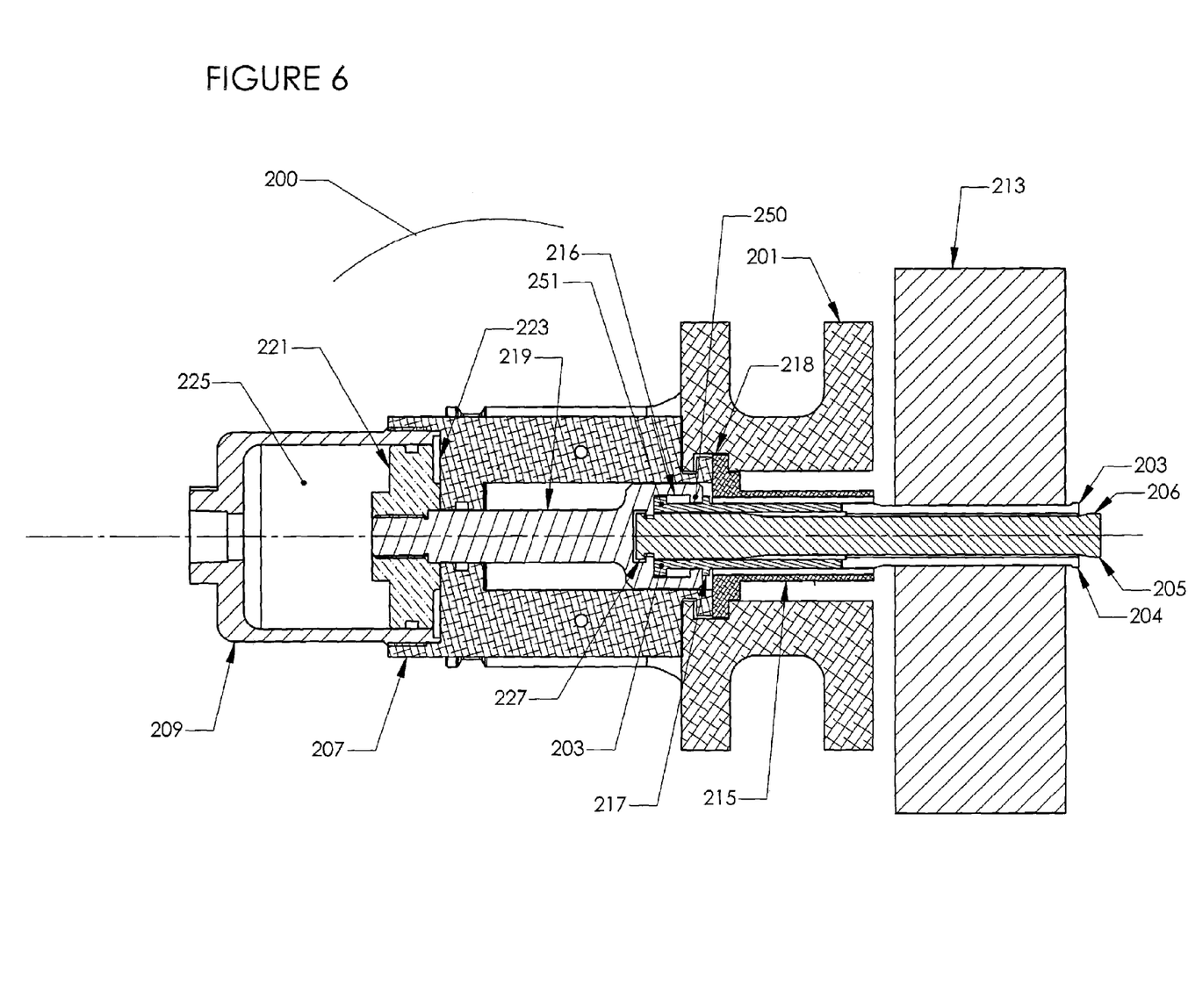
FIG. 6 is a cross-sectional view of the clamp assembly of the present invention.

Referring now to FIG. 6, the clamp assembly of the present invention can be described. Clamp assembly, generally designated as 200 in FIG. 6, has a clamp cylinder 209 fit to a base 207 located at its forward end. Clamp cylinder has a push chamber 225 which is that space within clamp cylinder 209 located rearward of a clamp piston 221. Clamp cylinder 209 also has a pull chamber 223 located forward of clamp piston 221. These chambers 223 and 225 vary in volume depending on movement of piston 221 in response to hydraulic fluid from the hydraulic circuit of the drill. Hydraulic fluid can be directed into either chamber 223 or 225. Attached to clamp piston 221 is a collet puller 219. Collet puller 219 is a rod which holds a collet 203 at its forward end while being connected to clamp piston 221 at its rearward end. Collet 203 is partially disposed within collet puller 219 and extends from the forward end of collet puller 219. Collet 203 has axial slots which allow its outer diameter to be collapsible. A tapered pilot 205 is disposed within the collet 203 and has a pilot flange 227 which fits the pilot 205 within the collet puller 219 independently of the collet 203. A collet guide 215 is also provided in the clamp assembly 200 which serves as a guide for alignment of the collet 203 and to create friction resisting collet axial movement. The collet guide abuts the forward end of the clamp cylinder base 207. The clamp assembly 200 is also provided with a clamp foot 201 which in operation of the drill rests on the workpiece 213 to be drilled. The collet 203 and pilot 205 extend through a suitable opening in the clamp foot and into a pre drilled hole in the workpiece 213. The clamp cylinder base 207 and collet guide 215 fit within a recess area 218 of the clamp foot 201 and are held fast during operation of the clamp assembly. A collet push flange 217 is provided on the collet 203 which contacts the fixed collet guide 215 during pushing of the collet 203 serving as a limit to its forward axial movement as shown in FIG. 6 which depicts an unclamped position of the clamp assembly 200. To initially fit the collet 203 in a hole in the workpiece, the pilot 205 is at a forward limit with collet 203. The collet 203 can be collapsed slightly to fit into the hole in the workpiece until the flange portion 204 of the collet 203 extends out of the hole. The unclamped position of clamping assembly 200 is shown in FIG. 6. To clamp the clamp assembly 200 to the workpiece 213, hydraulic fluid is directed to the pull chamber 223 which forces clamp piston 221 rearward. Collet puller 219 and pilot 205 are forced rearward. Collet 203 is not moved until collet puller face 250 contacts collet puller flange 251. Pilot 205 thereby moves axially relative to the collet 203, forcing the outer diameter of the collet 203 to expand. This expansion causes the outer diameter of collet flange 204 to be larger than the hole in the workpiece. As collet puller 219 continues to pull, puller face 250 contacts collet pull flange 251. Collet 203 and pilot 205 are pulled simultaneously. The collet 203 and pilot 205 both act as a tension member during pulling adding an increase in strength and rigidity compared to prior art designs which only pull with the pilot.

Rotary Gerotor Hydraulic Pump Assembly

Figure 7:
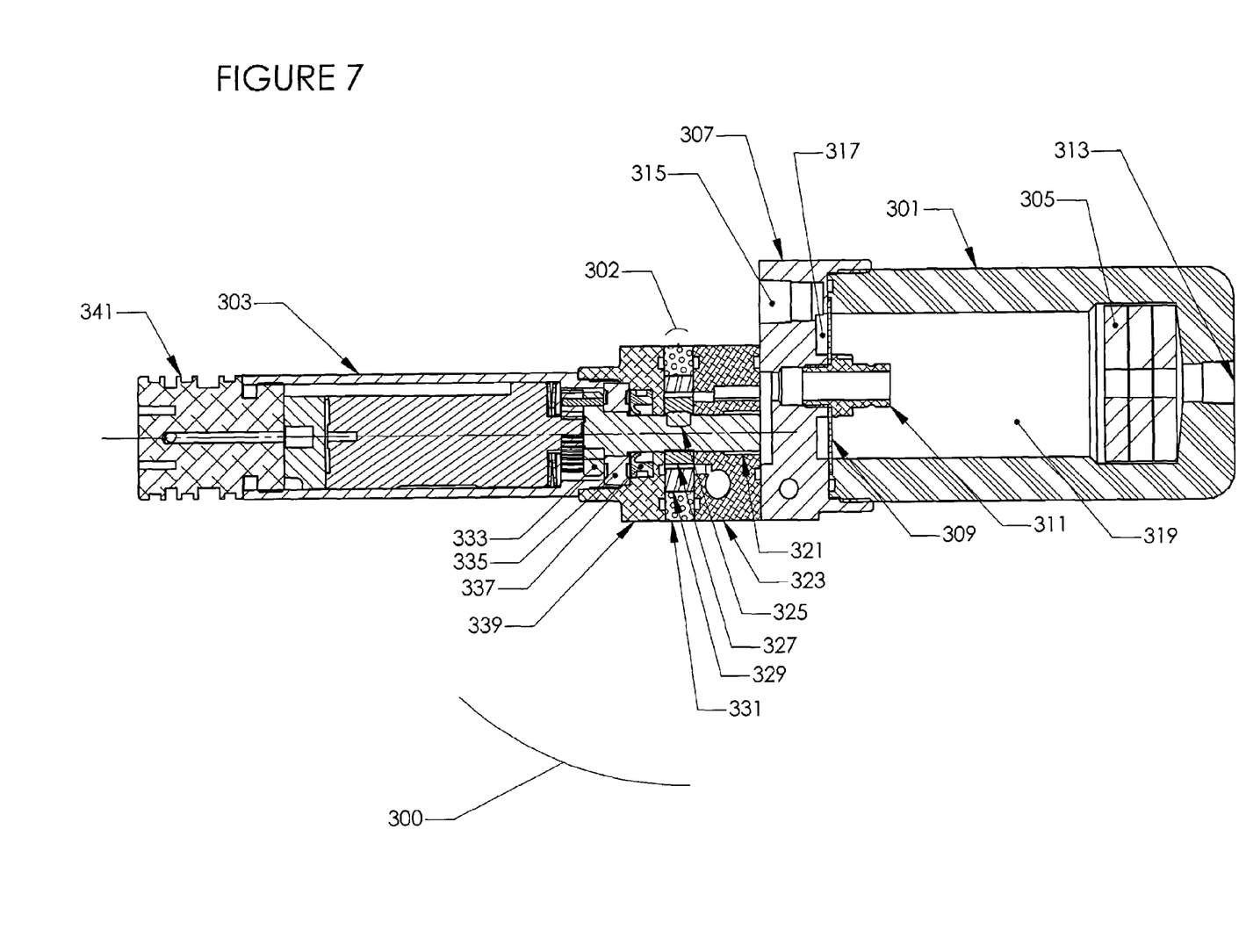
FIG. 7 is a cross-sectional view of the rotary gerotor hydraulic pump of the present invention.

Referring now to FIG. 7, the rotary gerotor hydraulic pump assembly generally designed as 300 can be described. The hydraulic pump assembly 300 has a fluid reservoir 301 at its rearward end (orientation best seen in FIG. 1) which is joined thereto through a join plate 307. Fluid reservoir 301 holds a quantity of hydraulic fluid which is used in the hydraulic circuit of the drill apparatus. Fluid reservoir 301 has a snorkel 311 which serves as a feed conduit from the fluid reservoir 301 to the rotary gerotor pump 302. Fluid reservoir 301 has an oil return area 317 which receives hydraulic fluid returning from the hydraulic circuit of the drill apparatus. A reservoir fill port 315 is also provided which opens to the oil return area and is used when hydraulic fluid is to be added to the fluid reservoir 301. All hydraulic fluid added to the fluid reservoir 301 or returning from the hydraulic circuit of the drill apparatus is filtered through filter 309. The filtering of small particles of debris from the hydraulic circuit of the drill apparatus has an obvious beneficial effect on the operation and reliability of the drill. It can be mentioned that prior art drills had problems with debris prematurely wearing and clogging the hydraulic circuit of the drill apparatus. Fluid reservoir has a chamber 319 where the hydraulic fluid is stored and air is separated from the hydraulic fluid. It is well know that in prior art drills air bubbles not yet bled from the system contaminate the hydraulic fluid used in the hydraulic circuit of the drill. The storage and separation chamber allows air bubbles to separate from the hydraulic fluid before being recycled to the hydraulic circuit of the drill. To that end a bleed port is provided in the rearward end of the reservoir 301 which allows bleeding of any air separated from the hydraulic fluid in the chamber 319. Reservoir 301 has a volume changer 305 disposed therein.

At the forward end of the rotary gerotor pump 302, an air motor 303 is provided and is attached thereto through a pump to motor adapter 339. The air motor 303 receives pressured air from the air circuit of the drill apparatus and powers rotary gerotor pump 302 during operation of the drill. Air motor 303 has an end fitting 341 which closes off its forward end. Air motor 303 is connected to a drive shaft 333 which is disposed in the rotary gerotor pump 302. Rotary gerotor pump 302 receives the drive shaft 333 within an outer housing 331. The outer housing 331 holds a gear assembly with an outer gerotor 329 and an inner gerotor 327 which are keyed to the drive shaft 333 with a key 325. In this setup, the air motor 303 when operating turns drive shaft 333 which in turn rotates inner gerotor 327 and outer gerotor 329. Hydraulic fluid from reservoir 301 is drawn through snorkel 311 into pump 302 and circulated through the hydraulic circuit of the drill apparatus. Drive shaft 333 disposed within the housing 331 of the rotary gerotor pump 302 is supported by bearing 321 at its rearward end. Bearing 321 is held in place by a bearing carrier 323 abutting housing 331. Seal 337 is provided around drive shaft 333 to prevent the mixing of pressurized air from air motor 303 and hydraulic fluid from rotary gerotor pump 302. Also, to support the drive shaft 333 at its forward end, within the adapter 339 a ball bearing 335 is provided which performs that function efficiently. This above described hydraulic pump assembly 300 has significant advantage over the prior art. With this hydraulic pump assembly, the problem of air leaking into the hydraulic fluid of the hydraulic circuit in the drill apparatus through the pump has been abated. The use of the rotary gerotor pump as the hydraulic pump in the drill, as opposed to a conventional piston-type shuttle pump, avoids one of the major problems present in prior art drills of this type, namely, the unwanted leaking of air into the hydraulic fluid of the drill.

Pneumatic-Hydraulic Circuit

Figure 8:
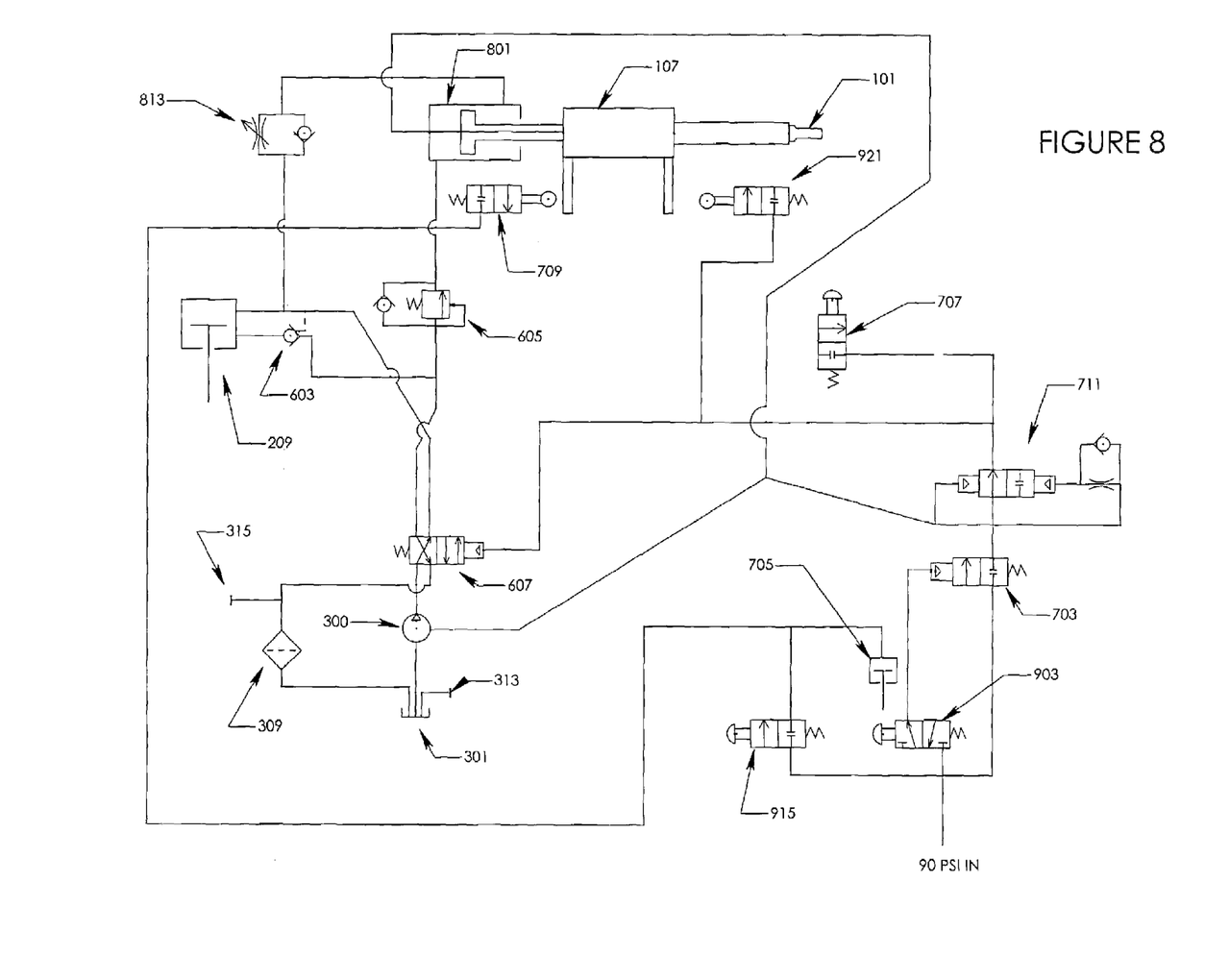
FIG. 8 is a schematic diagram of the pneumatic-hydraulic circuit of the present invention.
Figure 9:
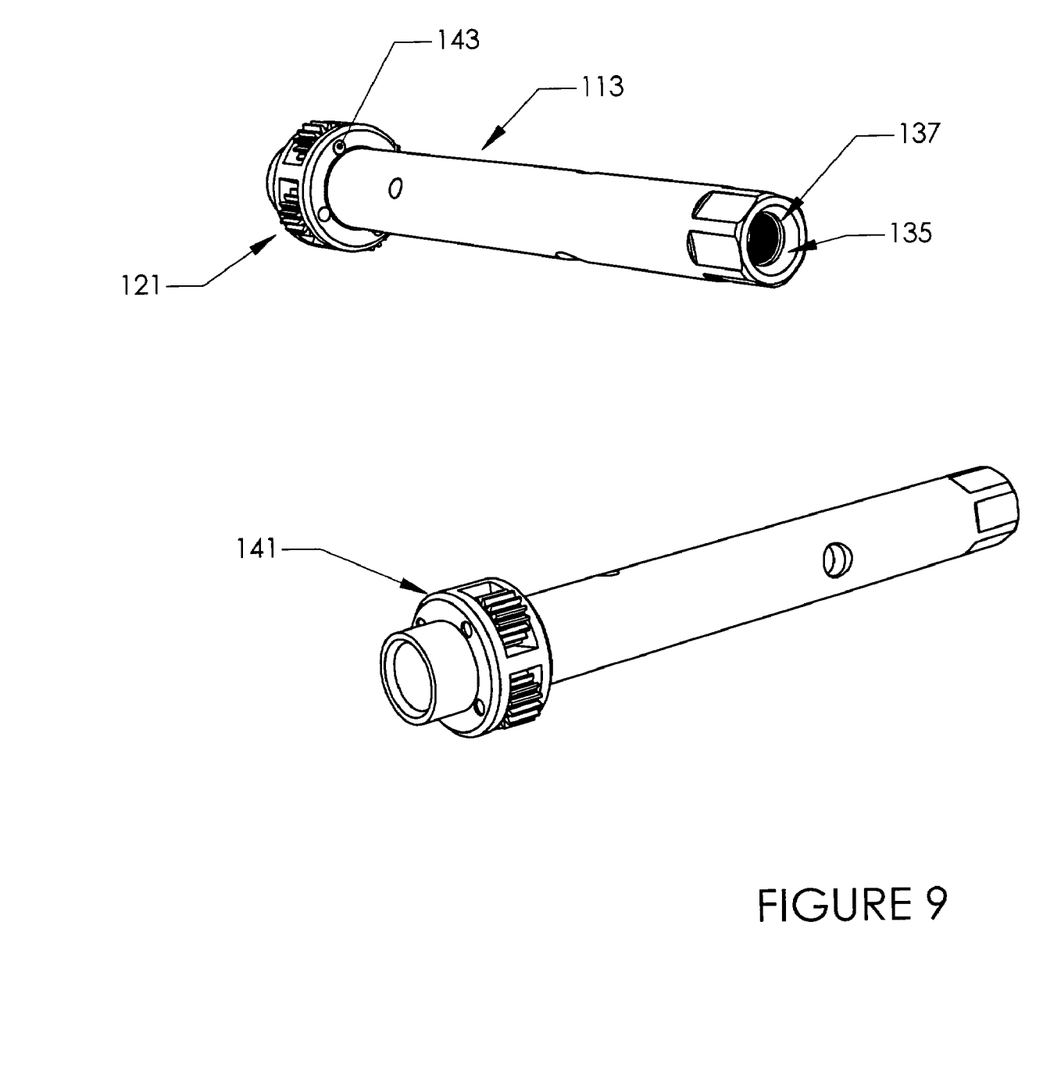
FIG. 9 is an isometric view of the drill spindle-planet carrier area of the present invention showing the integral assembly from two angles.

Referring now to FIG. 8, in conjunction with the other figures, a schematic of the pneumatic-hydraulic circuit of the drill is presented. FIG. 8 shows trigger 903 connected to a source of air, preferably 90 psi. Trigger 903 is connected to a pilot valve 703. Pilot valve 703 supplies air to main air motor 107 and hydraulic pump assembly 300. The pilot valve 703 is in turn connected to pulse valve 711. This above described sub-circuit allows the drill bit 101 to turn in response to the activation of air motor 107. The pressurized air circuit runs through the inner feed cylinder 805 to the air motor 107. A reversing button 707 is provided, which when depressed allows the drill to retract from the workpiece and causes the clamp circuit to unclamp. Opening of pilot valve 703 allows pressurized air to momentarily reach a four-way valve 607 within the hydraulic block 600. The four-way valve 607 controls the hydraulic fluid from pump assembly 300. Upon activation of four-way valve 607, hydraulic fluid is pumped through sequence valve 605 and clamp cylinder 209.

A pilot check valve 603 is provided upstream of the clamp cylinder 209. Feed control restrictor 813 is shown downstream of hydraulic fluid fed out of feed cylinder 801 to control the rate at which the drilling assembly is moved axially to a workpiece. As part of the hydraulic circuit and pump assembly, reservoir 301 is shown having a bleed port 313 and a fill port 315. Also, as part of the schematic diagram, auto cycle engage button 915 is shown which, if activated, starts an automatic cycle mode that will hold the trigger 903 depressed until a hole is completely drilled. When the drill bit 101 is retracted from the hole, the auto cycle button allows the clamp assembly to keep the drill clamped to the workpiece with the drill bit not rotating thereby avoiding the unnecessary waste of pressurized air after the hole is drilled.

Operation of the Pneumatic-Hydraulic Circuit

The valve system of the drill unit as shown in FIG. 8 includes a four-way, two-position hydraulic valve 607 that is positioned between the hydraulic pump assembly 300 and the feed cylinder 801 and clamp cylinder 209. The four-way hydraulic valve 607 is actuatable between a first position wherein pressurized hydraulic fluid is supplied to the retract chamber of the feed cylinder 801 causing the outer piston 807 to retract, and a second position wherein pressurized hydraulic fluid is applied to the extend chamber of the feed cylinder causing the outer piston 807 to extend. A spring pilot biases the hydraulic valve 607 in its first position and an air actuated pilot moves the hydraulic valve 607 from its first to its second position when pressurized air is supplied to the air actuated pilot. The air actuated pilot is in fluid communication with a retract valve 921 that is mounted in the forward end of the housing 105. The retract valve 921 initiates the actuation of valves to cause the air motor 107 to retract and also operates as a mechanical stop to limit the forward travel of the motor.

A pulse valve 711 is positioned between the pilot valve 703 and the portion of the pneumatic circuit consisting of the retract valve 921 and the pilot of the hydraulic valve 607. The pulse valve 711 is actuatable between a first position wherein the retract valve 921 and pilot of valve 607 are in fluid communication with the pilot valve 703, and a second position wherein the retract valve 921 and pilot of valve 607 are isolated from the pilot valve 703. The pulse valve 711 transmits a pulse of pressurized air to the retract valve 921 and the pilot of valve 607 when the pulse valve is in its first position. A first pilot moves the pulse valve into the first position when the trigger valve is first actuated, and a second pilot moves the pulse valve 711 into its second position a set time interval after the pilot valve 703 has been actuated.

The drill unit also includes a sequence valve 605 that is positioned between the hydraulic valve 607 and the extend chamber of the feed cylinder 801. The sequence valve 605 is actuatable between a first position wherein the hydraulic valve 607 is not in fluid communication with the extend chamber and a second position wherein the hydraulic valve 607 is placed in fluid communication with the extend chamber. The sequence valve 605 includes a hydraulic pilot (not shown) that moves the sequence valve 605 into its second position when the hydraulic pressure reaches a predetermined percentage of the final value. This results in a time delay that insures that the drill unit is clamped to the workpiece before the feed cylinder 801 begins to advance the motor 107 and drill bit 101 toward the workpiece.

In the preferred embodiment, the pulse valve and a portion of the pneumatic circuitry is housed within the pneumatic module or block 701 that is mounted to the drill. The hydraulic logic module or block 601 that also mounts to the drill contains the hydraulic valves and a portion of the drill unit hydraulic circuitry.

When the drill unit is to be used in a drilling operation, it is attached to a source of pressurized air. Upon supplying pressurized air to the drill unit, the hydraulic pump 301 operates to establish the necessary hydraulic pressure to activate the feed cylinder 801 and clamp cylinder 209. The collet 203 of the drill unit is inserted into a hole that has been previously drilled in the workpiece, and the foot 201 of the clamp assembly 200 is held against the workpiece or a template attached to the workpiece. When the drill bit 101 of the drill unit is aligned with the location at which a hole is to be drilled, the trigger 903 is actuated and pressurized air is supplied to the air motor 107 causing it to rotate the drill bit. Actuation of the trigger 903 also allows pressurized air to pass through the pulse valve 711 and pressurize the retract valve 921 and the pilot of the hydraulic valve 607, thereby moving the hydraulic valve 607 into its second position which allows hydraulic fluid to pressurize the clamp and feed cylinders, 209 and 801 respectively. After pressurization of the retract valve 921 and the pilot of hydraulic valve 607, the pulse valve 711 shifts into its second position, isolating the retract valve 921 and pilot of hydraulic valve 607 from the rest of the pneumatic circuit.

When the hydraulic valve 607 is shifted into its second position, pressurized hydraulic fluid is directed to the clamp cylinder 209 causing the collet 203 to clamp to the inner surface of the hole into which it was inserted. Pressurized hydraulic fluid is simultaneously directed to the sequence valve 605. The sequence valve 605 is actuated by its hydraulic pilot (not shown) when a predetermined pressure is reached due to stalling of the clamp mechanism against the workpiece and allows hydraulic fluid to flow to the extend chamber of the feed cylinder 801. When the pressurized hydraulic fluid enters the extend chamber, the outer piston 807 of the feed cylinder 801 is urged forwardly, thereby advancing the air motor 107 and rotating the drill bit 101 toward the workpiece. Once a hole has been formed in the workpiece, the air motor 107 contacts the retract valve 921. The retract valve 921 is actuated to release pressurized air to the atmosphere, thereby releasing the pressurized air held in the circuit formed by the retract valve 921 and the pilot of the hydraulic valve 607. When the pressure at the pilot of hydraulic valve 607 is released, the hydraulic valve 607 is moved back into its first position by the spring pilot to start the retract portion of the drilling cycle.

With the hydraulic valve in it first position, pressurized hydraulic fluid is directed to the retract chamber of the feed cylinder 801 and the extend chamber of the clamp cylinder 209. The pressurized hydraulic fluid filling the retract chamber of the feed cylinder causes the feed cylinder 801 to retract the air motor 107 and drill bit 101 away from the workpiece. The pressurized hydraulic fluid supplied to the pilot-operated check valve 603 of the clamp circuitry causes the collet 203 to unclamp and allows the drill unit to be withdrawn from the workpiece, thus completing a drilling cycle.

What is claimed is:

1. A pneumatic-hydraulic drill comprising:
 a main housing having a front end and a rear end with an opening extending therethrough from the front end to the rear end;
 a hydraulically activated feed cylinder external to said main housing and adjacent to the rear end of said housing, said feed cylinder including a cylinder having a forward end and a rear end and having a central bore that is substantially parallel to said opening of said main housing, said feed cylinder further including an outer piston having an axial bore that extends forwardly from said outer piston, said outer piston at least partially disposed within said feed cylinder, said outer piston configured for axial movement within the central bore of said cylinder;
 a pneumatically activated motor, said motor being configured to fit within the opening of said housing, said motor having a forward end and a rear end, said rear end of said motor being attached to the forward end of the rod of said feed cylinder, said axial bore of said outer piston being in fluid communication with said motor to supply pressurized air to said motor, said motor being movable between a rearmost position wherein the outer piston of said feed cylinder is in a retracted position and a forwardmost position wherein the outer piston of said feed cylinder is in said extended position;
 a drill spindle assembly comprising a drill spindle and a planet gear carrier, said drill spindle having a front end and rear end and adapted to receive a drill bit in said front end, said drill spindle extending from the opening of said main housing at the front end of said housing, said planet gear carrier connected to the forward end of said pneumatically activated motor and adapted to rotate in response to the activation of said pneumatically activated motor whereby said drill spindle is also rotated, wherein said drill spindle assembly comprises a one-piece structure having a rear end and a front end, the rear end of the drill spindle assembly extending from the forward end of said pneumatically activated motor, the front end of said drill spindle assembly configured to receive said drill bit for drilling a hole and extending beyond the front end of said main housing, wherein the drill spindle of the drill spindle assembly is integral with the planet gear carrier of the drill spindle assembly thereby eliminating a joint between said drill spindle and said planet gear carrier to improve the precision and accuracy of a drilled hole;
 a pneumatically operated gerotor pump, said rotary gerotor pump actuated by a first air motor connected thereto, said rotary gerotor pump used for pressurizing hydraulic fluid for delivery to said feed cylinder;
 a first valve system for controlling the operation of said drill;
 a first circuit for supplying air from a source of pressurized air to the axial bore of the outer piston of said feed cylinder, to said rotary gerotor pump, and to said first valve system; and
 a second circuit for supplying pressurized hydraulic fluid to said feed cylinder and to said first valve system.

2. The drill system of claim 1, wherein said rotary gerotor pump includes a gerotor assembly having a first gear with external gear teeth and a second gerotor gear having internal teeth which cooperate with the teeth of the first gear of said gerotor assembly such that air from said first air motor is prevented from leaking into the hydraulic fluid used by said rotary gerotor pump.

3. The drill of claim 2, wherein said rotary gerotor pump includes a reservoir and said second circuit includes a filter whereby hydraulic fluid of said second circuit returning to said reservoir passes through a filter allowing for removal of foreign particles in the hydraulic fluid and air bubbles in said reservoir of said rotary gerotor pump.

4. The drill of claim 1, wherein said first valve system for operating the drill includes a pilot valve and a trigger, said pilot valve responsive to a pulling of a trigger connected to said pilot valve by an operator whereby said pilot valve controls the operation of the drill.

5. The apparatus of claim 1, wherein said first circuit includes an automatic cycle circuit whereby said trigger is held in a depressed position until the drill completely drills a hole in a workpiece, and further when the drill is retracted from the hold, said automatic cycle prevents turning of the drill.

6. The apparatus of claim 1, wherein said planet gear carrier includes a planet gear assembly.

7. The apparatus of claim 6, wherein said planet gear assembly includes at least one planet gear.

8. The apparatus of claim 7, wherein said planet gear carrier has at least one gear axle, said gear axle running through one of said planet gears of said planet gear assembly.

9. The apparatus of claim 8, wherein said planet gear carrier has four gear axles and said gear assembly has four planet gears.

10. The apparatus of claim 1 further comprising a clamp assembly for clamping the drill to a workpiece, said clamp assembly having a front end and a rear end with the front end of said clamp assembly nearer to the workpiece than the rear end and the rear end of said clamp assembly farther from the workpiece than the front end.

11. The apparatus of claim 10 further comprising a hydraulically activated clamp feed cylinder, said clamp feed cylinder connected to the rear end of said clamping assembly and axially aligned with said clamping assembly, said clamp feed cylinder having a cylinder with a bore, said cylinder having a forward end and a rear end, said clamp feed cylinder also includes a piston and a puller that are disposed in the bore of said clamp feed cylinder and said piston and rod configured for axial movement within the bore of said clamp feed cylinder.

12. The apparatus of claim 11, wherein said clamp assembly includes a collet having an axial bore with a pilot disposed therein, said pilot fixed to the puller of said clamp feed cylinder with the movement of said pilot within said collet in a forward and rearward direction being controlled by the forward and rearward movement of the puller of said clamp feed cylinder, wherein said collet and said pilot are moved simultaneously by said clamp feed cylinder.

13. The apparatus of claim 12, wherein said collet and said pilot are in axial tension when the drill is clamped to the workpiece such that said collet and said pilot act as a single tension member.

14. The apparatus of claim 13, wherein said clamping assembly includes a clamp foot mounted to the drill unit, said clamp foot abutting the workpiece during operation of the drill, said clamp foot having an aperture therein in which said collet of said clamp assembly is disposed, said clamp foot configured to allow movement of said collet relative to said clamp foot.

15. The apparatus of claim 14, wherein the shape of said clamp foot is symmetrical about a longitudinal axis through said clamping assembly.

16. The apparatus of claim 1 further comprising an inner piston having an axial bore disposed in said feed cylinder, wherein the axial bore of said inner piston is at least partially disposed in said axial bore of said outer piston.

17. A pneumatic-hydraulic drill comprising:
 a main housing having a front end and a rear end with an opening extending therethrough from the front end to the rear end;
 a hydraulically activated feed cylinder external to said main housing and adjacent to the rear end of said housing, said feed cylinder including a cylinder having a forward end and a rear end and having a central bore that is substantially parallel to said opening of said main housing, said feed cylinder further including an outer piston having an axial bore that extends forwardly from said outer piston, said outer piston at least partially disposed within said feed cylinder, said outer piston configured for axial movement within the central bore of said cylinder;
 a pneumatically activated motor, said motor being configured to fit within the opening of said housing, said motor having a forward end and a rear end, said rear end of said motor being attached to the forward end of the rod of said feed cylinder, said axial bore of said outer piston being in fluid communication with said motor to supply pressurized air to said motor, said motor being movable between a rearmost position wherein the outer piston of said feed cylinder is in a retracted position and a forwardmost position wherein the outer piston of said feed cylinder is in said extended position;
 a drill spindle assembly comprising a drill spindle and a planet gear carrier, said drill spindle having a front end and rear end and adapted to receive a drill bit in said front end, said drill spindle extending from the opening of said main housing at the front end of said housing, said planet gear carrier connected to the forward end of said pneumatically activated motor and adapted to rotate in response to the activation of said pneumatically activated motor whereby said drill spindle is also rotated, wherein said drill spindle assembly comprises a one-piece structure having a rear end and a front end, the rear end of the drill spindle assembly extending from the forward end of said pneumatically activated motor, the front end of said drill spindle assembly configured to receive said drill bit for drilling a hole and extending beyond the front end of said main housing, wherein the drill spindle of the drill spindle assembly is integral with the planet gear carrier of the drill spindle assembly thereby eliminating a joint between said drill spindle and said planet gear carrier to improve the precision and accuracy of a drilled hole;
 a hydraulic pump assembly comprising a fluid reservoir, a rotary gerotor pump, and an air motor, the fluid reservoir being disposed at a rearward end of the hydraulic pump assembly and defining a storage and separation chamber for allowing air bubbles to separate from the hydraulic fluid, a reservoir fill port opening to the storage and separation chamber for adding hydraulic fluid to the chamber, a filter disposed between the reservoir fill port and the fluid reservoir, a bleed port positioned at a rearward end of the fluid reservoir which allows any air separated from the hydraulic fluid in the chamber to exit the reservoir, a snorkel surrounded by a join plate and connecting the fluid reservoir to the rotary gerotor pump, the snorkel for delivering fluid to the rotary gerotor pump, the rotary gerotor pump actuated by a first air motor connected thereto and used for pressurizing hydraulic fluid for delivery to the feed cylinder, the rotary gerotor pump comprises a gerotor assembly having a gear assembly comprising a first gear with external gear teeth and a second gerotor gear having internal teeth which cooperate with the teeth of the first gear of the gerotor assembly such that air from the first air motor is prevented from leaking into the hydraulic fluid used by the rotary gerotor pump, an outer housing surrounding the rotary gerotor pump, a drive shaft coupled to the rotary gerotor pump when the outer housing, the drive shaft being supported by a bearing at a rearward end of the drive shaft, a seal configured around the drive shaft for preventing pressurized air from the air motor from mixing with hydraulic fluid from the rotary gerotor pump, the rotary gerotor pump connected to and actuated by the air motor, wherein the hydraulic pump assembly prevents leaking of air into the hydraulic fluid of the drill;

a first valve system for controlling the operation of said drill;

a first circuit for supplying air from a source of pressurized air to the axial bore of the outer piston of said feed cylinder, to said rotary gerotor pump, and to said first valve system, wherein said first circuit includes an automatic cycle circuit whereby said trigger is held in a depressed position until the drill completely drills a hole in a workpiece, and further when the drill is retracted from the hold, said automatic cycle prevents turning of the drill;

a second circuit for supplying pressurized hydraulic fluid to said feed cylinder and to said first valve system; and a clamping assembly for clamping the drill to a workpiece having a front end and a rear end with the front end of the clamping assembly closer to the workpiece than the rear end of the clamping assembly, the clamping assembly comprising a hydraulically activated clamp feed cylinder, the clamp feed cylinder connected to the rear end of the clamp assembly and axially aligned with the clamping assembly, the clamp feed cylinder having a cylinder with a bore, the cylinder having a forward end and a rear end, the clamp feed cylinder also comprises a piston and a puller that are disposed in the bore of the clamp feed cylinder and the piston and rod configured for axial movement within the bore of the clamp feed cylinder, the clamping assembly further comprising a collet having an axial bore with a pilot disposed therein, the pilot fixed to the puller of the clamp feed cylinder with the movement of the pilot within the collet in a forward and rearward direction being controlled by the forward and rearward movement of the puller of the clamp feed cylinder, wherein the collet and the pilot are moved simultaneously by the clamp feed cylinder and wherein the collet and the pilot are in axial tension when the drill is clamped to the workpiece such that said collet and said pilot act as a single tension member.

* * * * *